ns to light and resistance to sublimation, on polyesters. The superior sublimation fastness possessed by the compounds of the invention renders them particularly useful in the thermal fixation technique of dyeing polyester materials.

United States Patent Office 3,631,020
Patented Dec. 28, 1971

3,631,020
MONOAZO COMPOUNDS CONTAINING A HYDROCARBYL SULFONAMIDOALKYL ANILINE COUPLING COMPONENT
Max A. Weaver and David J. Wallace, Kingsport, Tenn., assignors to Eastman Kodak Company, Rochester, N.Y.
No Drawing. Continuation-in-part of applications Ser. No. 567,062 and Ser. No. 567,082, both July 22, 1966. This application Sept. 27, 1968, Ser. No. 763,401
Int. Cl. C09b 29/00; D06p 1/04, 3/52
U.S. Cl. 260—158
11 Claims

ABSTRACT OF THE DISCLOSURE

Monoazo compounds which are particularly useful for dyeing polyester textile materials, exhibiting thereon excellent fastness to light and resistance to sublimation, have a heterocyclic diazo component and a coupling component having the formula

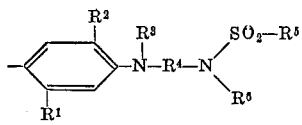

in which $R^1$ is hydrogen, alkyl, chlorine, bromine or acylamino; $R^2$ is hydrogen, alkyl or alkoxy; $R^3$ is hydrogen, alkyl, cyclohexyl, aralkyl, or aryl; $R^4$ is alkylene; $R^5$ is alkyl, cyclohexyl, aryl, or amino; and $R^6$ is substituted alkyl, cyclohexyl, aralkyl, aryl, thiazolyl, benzothiazolyl, thiadiazolyl, triazolyl, benzimidazolyl, pyridyl, quinolyl, or, when $R^1$ is acylamino, alkyl.

---

This application is a continuation-in-part of our copending applications Ser. Nos. 567,062 and 567,082, each of which was filed July 22, 1966 for "Azo Dyes for Hydrophobic Fibers" and each of which is abandoned.

This invention relates to certain novel, water-insoluble monoazo compounds and, more particularly, to monoazo compounds useful as dyes for polyester textile materials and to polyester textile materials dyed with the novel compounds.

The novel azo compounds of the invention have the formula (I)
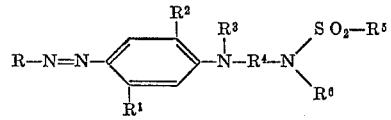

wherein

R is a 2-thiazolyl radical, a 2-benzothiazolyl radical, a 1,3,4-thiadiazol-2-yl radical, a 1,2,4-thiadiazol-5-yl radical, or a 2-thienyl radical;
$R^1$ is hydrogen, lower alkyl, halogen, or a group having the formula —NHA in which A is an acyl group;
$R^2$ is hydrogen, lower alkyl, or lower alkoxy;
$R^3$ is hydrogen, a lower alkyl radical, cyclohexyl, an aralkyl radical or an aryl radical;
$R^4$ is a lower alkylene radical;
$R^5$ is a lower alkyl radical, cyclohexyl, an aryl radical or an amino group; and
$R^6$ is substituted lower alkyl, cyclohexyl, an aralkyl radical, an aryl radical, a thiazolyl radical, a benzothiazolyl radical, a thiadiazolyl radical, a triazolyl radical, a benzimidazolyl radical, a pyridyl radical, a quinolyl radical, or, when $R^1$ is —NHA, lower alkyl.

The novel compounds of the invention give scarlet to turquoise dyeings when applied according to conventional dyeing procedures to polyester textile materials such as fibers, yarns, and fabrics. The novel azo compounds exhibit improved fastness properties, such as fast- The heterocyclic diazo component represented by R can be unsubstituted or, preferably, substituted with, for example, lower alkyl, lower alkoxy, aryl, nitro, halogen, lower alkylthio, lower halkoxycarbonylalkylthio, cyclohexylthio, arylthio, lower aralkylthio, formyl, lower alkoxycarbonyl, aroyl, lower alkanoylamino, aroylamino, cyano, lower alkylsulfonyl, arylsulfonyl, lower alkylsulfonamido, trifluoromethyl, sulfamoyl, lower alkylsulfamoyl, carbamoyl, lower alkylcarbamoyl, thiocyanate, etc. The alkanoyl groups can be substituted with substituents such as halogen, phenyl, cyano, lower alkoxy, lower alkylthio, lower alkylsulfonyl, etc. The alkylsulfonyl groups can also be substituted, for example, with cyano, hydroxy, halogen and the like. The alkoxycarbonyl groups can be substituted, for example, with hydroxy or cyano. As used herein to describe a group containing an alkyl moiety, "lower" designates a carbon content from 1 to about 4 carbon atoms. Examples of the alkyl and alkoxy groups which can be present on the diazo components include methyl, ethyl, isopropyl, propyl, butyl, methoxy, ethoxy, propoxy, butoxy, etc. Chlorine and bromine are typical halogen atoms. Methylsulfonyl, ethylsulfonyl, propylsulfonyl, butylsulfonyl, 2-cyanoethylsulfonyl, 2-hydroxyethylsulfonyl, acetyl, propionyl, butyryl, isobutyryl, 3-chloropropionyl, cyanoacetyl, methoxycarbonyl, ethoxycarbonyl, propoxycarbonyl, 2-cyanoethoxycarbonyl, 2-hydroxyethoxycarbonyl, etc. are examples of the alkylsulfonyl, alkanoyl, and alkoxycarbonyl groups which can be present on the heterocyclic groups represented by R.

Acetamido, propionamido, methylsulfonamido, ethylsulfonamido, and butylsulfonamido are typical alkanoylamino and alkylsulfonamido substituents which can be present on the diazo component. Dimethylsulfamoyl, ethylsulfamoyl, butylsulfamoyl, diethylcarbamoyl, propylcarbamoyl, dibutylcarbamyl are examples of the alkylsulfamoyl and alkylcarbamoyl groups. The aryl groups which can be present on the diazo component including the aryl moiety of the arylthio, aralkylthio, aroyl and arylsulfonyl groups are preferably monocyclic, carbocyclic aryl such as phenyl and phenyl substituted, for example, with lower alkyl, e.g. tolyl; lower alkoxy, e.g. anisyl; halogen, e.g. chlorophenyl, bromophenyl; nitro, e.g. m-nitrophenyl; etc. Benzoyl, p-tolyol, p-chlorobenzoyl, p-nitrobenzoyl, p-ethoxyphenylthio, p-chlorobenzylthio, benzamido, p-tolylamino, p-tolylsulfonyl, p-ethoxyphenylsulfonyl, benzylthio, p-chlorobenzothio, etc. are examples of the aryl-containing groups which can be present on the heterocyclic groups represented by R. The acyl groups set forth below in the definition of $R^1$ are further examples of the groups which can be present on the diazo component.

Typical groups represented by R include 2-thiazolyl,
5-nitro-2-thiazolyl,
5-bromo-2-thiazolyl,
5-thiocyanato-2-thiazolyl,
4-trifluoromethyl-2-thiazolyl,
4-ethoxycarbonyl-2-thiazolyl,
5-cyano-2-thiazolyl,
5-acetamido-2-thiazolyl,
4-methylsulfonyl-2-thiazolyl,
4-methyl-5-nitro-2-thiazolyl,
2-benzothiazolyl,
6-methylsulfonyl-2-benzothiazolyl,
6-ethoxycarbonyl-2-benzothiazolyl, 6-cyano-2-benzothiazolyl,
6-sulfamoyl-2-benzothiazolyl,
6-thiocyanato-2-benzothiazolyl,
6-N,N-dimethylsulfamoyl-2-benzothiazolyl,
4,6-dichloro-2-benzothiazolyl,
4-methyl-6-nitro-2-benzothiazolyl,
5-methyl-1,3,4-thiadiazol-2-yl,
5-thiocyanato-1,3,4-thiadiazol-2-yl,
5-cyclohexylthio-1,3,4-thiadiazol-2-yl,
5-ethylthio-1,3,4-thiadiazol-2-yl,
5-phenylthio-1,3,4-thiadiazol-2-yl,
5-acetamido-1,3,4-thiadiazol-2-yl,
5-chloro-1,3,4-thiadiazol-2-yl,
5-beta-cyanoethylthio-1,3,4-thiadiazol-2-yl,
5-ethoxycarbonylmethylthio-1,3,4-thiadiazol-2-yl,
5-phenylsulfonyl-1,3,4-thiadiazol-2-yl,
3-methylsulfonyl-1,2,4-thiadiazol-5-yl,
3-butylthio-1,2,4-thiadiazol-5-yl,
5-benzoyl-3-nitro-2-thienyl,
3-nitro-5-p-toluoyl-2-thienyl,
3,5-di(methylsulfonyl)-2-thienyl,
5-methylsulfonyl-3-nitro-2-thienyl,
5-ethylsulfamoyl-3-nitro-2-thienyl,
3-nitro-2-thienyl,
3,5-dinitro-2-thienyl,
5-ethoxycarbonyl-2-thienyl, etc.

Preferred groups represented by R have the formula

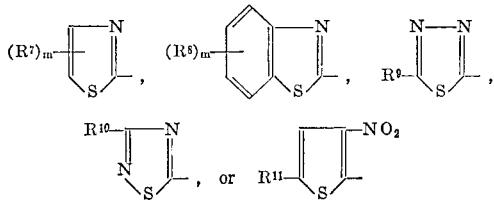

wherein $R^7$ is hydrogen, lower alkyl, lower alkoxy, nitro, halogen, lower alkylsulfonyl, carbamoyl, lower alkylcarbamoyl, lower alkoxycarbonyl, sulfamoyl, lower alkylsulfamoyl, cyano, thiocyanato, trifluoromethyl, phenyl or substituted phenyl; $R^8$ is hydrogen, lower alkyl, lower alkoxy, nitro, halogen, lower alkylsulfonyl, substituted lower alkylsulfonyl, carbamoyl, lower alkylcarbamoyl, lower alkoxycarbonyl, sulfamoyl, lower alkylsulfamoyl, cyano, thiocyanato, lower alkylthio, cyclohexylthio, phenylthio, substituted phenylthio, or trifluoromethyl; $R^9$ is hydrogen, lower alkyl, lower alkoxy, halogen, lower alkylthio, benzylthio, cyclohexylthio, phenylthio, substituted phenylthio, phenyl, substituted phenyl, benzyl, lower alkylsulfonyl, lower alkanolyamino, lower alkylsulfonamido, benzamido, lower alkoxycarbonyl, lower alkoxycarbonylalkylthio, thiocyanato, sulfamoyl, or lower alkylsulfamoyl; $R^{10}$ is lower alkylthio, cyclohexylthio, benzylthio, or lower alkylsulfonyl; and $R^{11}$ is lower alkanoyl, benzoyl, or substituted benzoyl. When m is 2, the substituents represented by $R^7$ and $R^8$ can be the same or different.

Examples of the alkyl and alkoxy groups and halogen atoms which $R^1$ and $R^2$ can represent are set forth in the preceding description of the groups that can be present on the heterocyclic diazo components represented by R. The acyl groups, designated A in the substituent —NHA which $R^1$ can represent, can be formyl, lower alkanoyl, aroyl, cyclohexylcarbonyl, lower alkoxycarbonyl, aryloxycarbonyl, lower alkylsulfonyl, arylsulfonyl, carbamoyl, lower alkylcarbamoyl, arylcarbamoyl, furoyl, etc. The alkanoyl, alkoxycarbonyl, and alkylsulfonyl groups can be substituted as described above relative to the description of the alkanoyl, alkoxycarbonyl and alkylsulfonyl groups which can be present on the groups represented by R. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-hydroxyethysulfonyl, and 2-chloroethylsulfonyl are examples of the alkanoyl, alkoxycarbonyl, and alkylsulfonyl groups which A can represent. The aryl group of the aroyl, aryloxycarbonyl, arylsulfonyl, and arylcarbamoyl group is preferably monocyclic, carbocyclic aryl such as unsubstituted phenyl and phenyl substituted with, for example, lower alkyl, lower alkoxy, halogen, hydroxy, etc. Tolyl, anisyl, p-bromophenyl, and o,p-dichloro phenyl are typical of such aryl groups. Dimethylcarbamoyl, ethylcarbamoyl, propycarbamoyl, and butylcarbamoyl are illustrative alkylcarbamoyl groups which A can represent.

The alkylene groups represented by $R^4$ can be straight- or branch-chain alkylene which can be substituted or unsubstituted. Ethylene, propylene, butylene, 2-hydroxypropylene, 2-chloropropylene, 2-bromopropylene, and 2-acetoxypropylene are typical of such alkylene groups.

The alkyl radicals represented by each of $R^3$ and $R^5$ can be unsubstituted or substituted, straight- or branch-chain lower alkyl. Representative examples of such alkyl radicals include methyl, ethyl, propyl, isopropyl, butyl, isobutyl, etc. and lower alkyl substituted, for example, with hydroxy, e.g. 2-hydroxyethyl, 2,3-dihydroxypropyl; lower alkoxy, e.g. 2-methoxyethyl; cyano, e.g. 2-cyanoethyl; lower cyanoalkoxyalkyl, e.g. 2-cyanoethoxyethyl; lower alkanoyloxy, e.g. acetoxyethyl; lower alkoxycarbonyl, e.g. 2-ethoxycarbonylethyl; halogen, e.g. 2-chloroethyl, 3-chloropropyl, 2-bromoethyl, 3-chloro-2-hydroxypropyl; lower alkanoylamino, e.g. 2-acetamidoethyl, 3-propionamidopropyl; carbamoyl, e.g. 2-carbamoylethyl; lower alkylcarbamoyl, e.g. ethylcarbamoylethyl, 3-dimethylcarbamoylpropyl; phenylcarbamoyloxy, e.g. 2-phenylcarbamoyloxyethyl; lower alkylsulfonyl, e.g. 2-methylsulfonylethyl, lower alkoxycarbonyloxy, e.g.

$$CH_3OCOOCH_2CH_2—$$

dicarboximido, e.g. 3-phthalimidopropyl, 3-glutarimidopropyl; 2-succinimidoethyl; phenoxy, e.g. 2-phenoxyethyl; lower alkylsulfonamido, e.g. 2-methylsulfonamidoethyl; pyrrolidinono, e.g. 2-(2-pyrrolidinono)ethyl; piperidono, e.g. 3-(2-piperidono)-propyl; phthalimidino, e.g. 2-phthalimidinoethyl; etc.

The aryl groups which each of $R^3$, $R^5$ and $R^6$ can represent preferably are monocyclic, carbocyclic aryl such as unsubstituted phenyl and phenyl substituted with lower alkyl, e.g. p-tolyl; lower alkoxy, p-anisyl; nitro, e.g. m-nitrophenyl; halogen; e.g. p-bromophenyl, o,p-dichlorophenyl; hydroxy, e.g. p-hydroxyphenyl. Representative aralkyl groups represented by $R^3$ and $R^6$ include lower alkyl substituted with monocyclic, carbocyclic aryl such as the aryl groups specified hereinabove. Specific examples of such aralkyl groups are benzyl 2-phenylethyl, p-ethylbenzyl, p-methoxycarbonylbenzyl, o,p-dihydroxybenzyl, etc.

Examples of the unsubstituted and substituted alkyl groups which $R^6$ can represent are set forth hereinabove in the definition of $R^3$ and $R^5$. The heterocyclic groups represented by $R^6$ can be unsubstituted or substituted as described in the above definition of R.

Particularly fast dyeings on polyester materials are obtained from the compounds having the formula

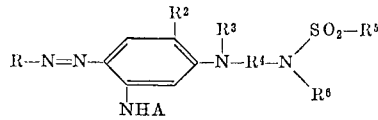

wherein R represents a heterocyclic group having the formula

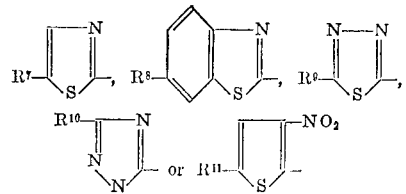

wherein

R⁷ is cyano, nitro, lower alkylsulfonyl, or lower alkoxycarbonyl;

R⁸ is cyano, nitro, lower alkylsulfonyl, lower alkoxycarbonyl, or thiocyanato;

R⁹ is lower alkyl, lower alkylthio, cyclohexylthio, phenylthio, lower alkylsulfonyl, or lower alkoxycarbonyl;

R¹⁰ is lower alkylthio or lower alkylsulfonyl; and

R¹¹ is lower alkanoyl, benzoyl, lower alkylbenzoyl, lower alkoxybenzoyl, halobenzoyl, or nitrobenzoyl;

A is lower alkanoyl, benzoyl, lower alkoxycarbonyl, lower alkylsulfonyl, or lower alkylcarbamoyl; and R² is hydrogen, methoxy or ethoxy;

R₄ is ethylene or propylene;

R⁵ is lower alkyl, phenyl or phenyl substituted with lower alkyl, lower alkoxy or halogen; and R⁶ is lower alkyl, benzyl, phenyl or phenyl substituted with lower alkyl, lower alkoxy or halogen.

The novel azo compounds of the invention are prepared according to known procedures by diazotizing a heterocyclic amine having the formula R—NH₂ and coupling the resulting diazonium salt with a compound having the formula (II) 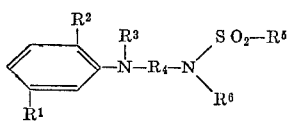

wherein R, R¹, R², R³, R⁴, R⁵ and R⁶ are defined above.

The heterocyclic amines R—NH₂ are known compounds and can be prepared by published techniques.

The coupler compounds of Formula (II) are prepared by known methods analagous to procedures described in the literature. The following examples illustrate the procedures which can be used in the preparation of representative compounds of Formula (II).

An amount of 27.8 g. of N-ethyl-N-(beta-methanesulfonamido) ethyl-m-toluidine is dissolved as its sodium salt in 100 ml. of water at about 65° C. At this temperature, 5.3 g. of acrylonitrile is added dropwise. The product, which crystallizes out on cooling to room temperature, is filtered off, washed with water and dried to yield 18 g. of a white solid, M.P. 77–78° C., having the structure:

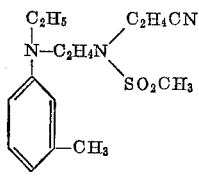

This coupler can be further reacted to yield other useful couplers, for example, by contacting Coupler A with sulfuric acid yields the corresponding amide having the formula

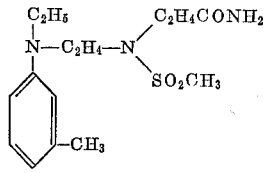

A mixture of 19.7 g. N-beta-chloroethyl-N-ethyl-m-toluidine, 13.9 N-beta-hydroxyethylmethanesulfonamide, 13.8 g. potassium carbonate and 100 ml. dry dimethyl formamide is stirred and refluxed together for one hour. The reaction is then drowned in water and the organic product extracted with chloroform. Evaporation of the chloroform extract gives the product as a pale yellow oil. It has the structure:

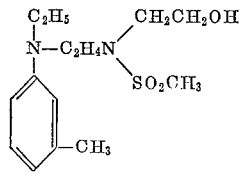

An alternative mode of preparing the above coupler is to react N-ethyl-N-(beta-methanesulfonamido)-ethyl-m-toluidine with beta-hydroxyethyl chloride which can be further reacted with acetic anhydride to yield the esterified derivative thereof or with phosphoryl chloride to give the N-beta-chloroethyl derivative.

The reaction of ethyl chloride and N-methyl-N-(beta-methane-sulfonamido)-ethyl-m-toluidine according to conventional methods yields the coupler having the formula:

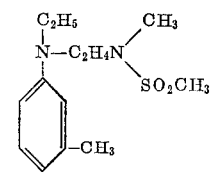

N-(2-chloroethyl)-N-ethyl - m-nitroaniline (22.8 g.), methanesulfonanilide (17.1 g.), potassium carbonate (13.8 g.) and N,N-dimethylformamide (100 ml.) are heated with stirring at 135° C. for 2.5 hours. The reaction mixture is drowned in water and the product is filtered off. Recrystallization from 2-methoxyethanol gave a purified product having a melting point of 114–115° C. This compound (29.0 g.) is hydrogenated in 250 ml. of ethanol in the pressence of Raney nickel at 75° C. and under 1500 p.s.i. The product is dissolved in additional alcohol (200 ml.) and the Raney nickel is removed by filtration. The hydrogenated compound, M.P. 116–118° C., is obtained upon concentrating the filtrate. The amino group present in the above product is acylated by treating 9.9 g. of the hydrogenated product dissolved in 25 ml. of benzene with 3.5 ml. of acetic anhydride. The reaction mixture is refluxed for 1 hour and the product is collected by filtering the cooled reaction mixture. This coupler has the formula A variety of coupler compounds can be prepared by the substitution of other reactants, such as substituted anilines, aralkyl halides, alkyl- and aryl-sulfonyl halides and acylating agents, well known in the art for the reactants employed in the above example.

The following examples illustrate the preparation of representative compounds of the invention.

EXAMPLE 1

A solution of 2.28 g. 2-amino-6-methylsulfonyl-benzothiazole in 50 g. 50% aqueous H₂SO₄ is cooled to −5° C. and a solution of 0.72 g. NaNO₂ in 5 cc. conc. H₂SO₄ is added, keeping the temperature below 0° C. After stirring 2 hr. at about 0° C., the reaction solution is added to a solution of 3.5 g. N-benzyl-N-methylsulfonyl-N'-ethyl-N'-m-tolylethylene-diamine in 100 cc. 15% aqueous H₂SO₄ all about 5° C. The coupling is continued at this temperature for 2 hr., then drowned with water, filtered, washed with water, and dried. The product dyes cellulose acetate and polyester fibers brilliant bluishred shades with excellent fastness properties. It has the formula:

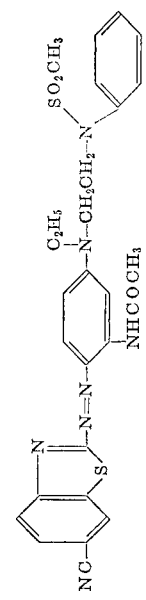

EXAMPLE 2

An amount of 0.72 g. sodium nitrite is added portionwise to 5 cc. conc. $H_2SO_4$; this solution is cooled in an ice bath to about 0° C., and 10 cc. 1:5 acid (1 part propionic acid:5 parts acetic acid) is added below 15° C. Then 1.75 g. 2-amino-6-cyanobenzothiazole is added, followed by 10 cc. 1:5 acid. The reaction is stirred 2 hours at 0–5° C., then added at about 5° C. to a solution of 3.75 g. of N-phenyl-N-methylsulfonyl-N'-ethyl-N'-(m-acetamidophenyl)ethylene diamine in 100 cc. 1:5 acid. Solid ammonium acetate is added until the solution turns Congo Red paper brown. After coupling 2 hours at ice-bath temperature, the mixture is drowned with water, filtered, washed with water, and air dried. The product dyes cellulose acetate polyester fibers brilliant red shades of excellent fastness properties. It has the formula

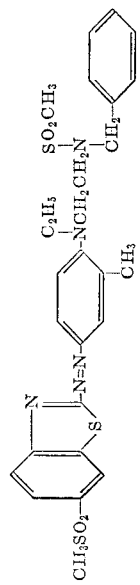

EXAMPLE 3

According to the procedure of Example I, 2.28 g. of 2-amino-6-methylsulfonylbenzothiazole is diazotized and coupled with 3.09 g. N-β-cyanoethyl-N-methylsulfonyl-N'-ethyl-N'-m-tolylethylenediamine, i.e. Coupler A. The product dyes polyester fibers brilliant red shades of excellent fastness.

The azo compounds of the examples of Table I are prepared according to the procedure of the preceding examples and conform to the general formula $$\underset{(R^8)_n}{\underset{S}{\overset{N}{\bigcirc}}}-N=N-\underset{R'}{\overset{R^2}{\underset{R_3}{\bigcirc}}}-N-R_4-N\underset{R_4}{\overset{SO_2-R_5}{\underset{R_6}{\bigcirc}}}$$

The color given for each of the compounds in Table I and the colors for the compounds in Table II through IV refer to dyeings on polyester fibers.

TABLE I

| Ex. No. | $(R^8)_m$ | $R^1$ | $R^2$ | $R^3$ | $R^4$ | $R^5$ | $R^6$ | Color |
|---|---|---|---|---|---|---|---|---|
| 4 | 6-CN | H | H | —$C_2H_5$ | —$CH_2CH_2$— | —$CH_3$ | —$C_2H_4Cl$ | Red. |
| 5 | 6-CN | H | H | —$C_2H_4OH$ | —$CH_2CH_2CH_2$— | —$CH_3$ | —$C_2H_4Cl$ | Red. |
| 6 | 6-$SO_2CH_3$ | —$CH_3$ | H | —$C_2H_4Cl$ | —$CH_2CH_2CH_2$— | —$C_2H_5$ | —$C_2H_4Br$ | Red. |
| 7 | 6-$SO_2CH_3$ | —Cl | H | —$C_2H_4Cl$ | $\underset{CH_3}{-CH_2CH-}$ | —$C_6H_5$ | —$C_2H_4CONH_2$ | Red. |
| 8 | 6-$NO_2$ | —Cl | H | —$C_4H_9$ | —$CH_2CH_2$— | —$C_2H_5$ | —$C_2H_4OCH_3$ | Pink. |
| 9 | 6-$NO_2$ | —$OCH_3$ | H | —$C_4H_9$ | Same as above | m-tolyl | $C_2H_4OCH_3$ | Violet. |
| 10 | 6-$SO_2NH_2$ | —$OCH_3$ | H | —$CH_3$ | —$CH_2CH_2$— | m-tolyl | $\underset{OH}{-CH_2CHCH_2Cl}$ | Pink. |
| 11 | 6-$SO_2NH_2$ | —$NHCOCH_3$ | H | —$CH_3$ | —$CH_2CH_2$— | —$C_2H_4Cl$ | Same as above | Violet. |
| 12 | 6-$SO_2C_2H_5$ | —$NHCOCH_3$ | H | —$C_2H_5$ | —$CH_2CH_2$— | —$C_2H_4Cl$ | —$C_2H_4NHCOCH_3$ | Do. |
| 13 | 6-$SO_2C_4H_9$ | —$OCH_3$ | —$OCH_3$ | —$C_2H_5$ | —$CH_2CH_2$— | —$CH_3CH_2OCH_3$ | —$C_2H_4OCNHC_6H_5$ (with O=) | Pink. |
| 14 | 6-$SO_2CH_3$ | —$NHCOCH_3$ | —$OCH_3$ | —$C_2H_5$ | —$CH_2CH_2$— | —$CH_3$ | —$C_6H_5$ | Violet. |
| 15 | 6-$SO_2C_2H_4CN$ | 3-$CH_3$ | H | —$CH_2CHCH_2Cl$ (OH) | —$CH_2CH_2$— | —$NO_2$ (phenyl) | —$C_2H_4CN$ | Red. |
| 16 | 6-$SO_2C_2H_4CN$ | H | H | —$CH_2CHCH_2Cl$ | —$CH_2CH_2$— | Same as above | —$C_2H_5$ | Red. |
| 17 | 6-$SO_2N(CH_3)_2$ | H | H | Same as above | —$CH_2CH_2$— | do | —$C_2H_5$ | Red. |
| 18 | 6-$SO_2N(CH_3)_2$ | 3-$CH_3$ | H | —$C_2H_5$ | —$CH_2CH_2$— | —$CH_3$ | —$C_2H_4CN$ | Red. |
| 19 | 6-$SOCH_3$ | 3-$CH_3$ | H | —$C_2H_5$ | —$CH_2CH_2$— | —$CH_3$ | —$C_2H_4CN$ | Red. |
| 20 | 6-$SO_2C_2H_4CN$ | 3-$CH_3$ | H | —$C_2H_5$ | —$CH_2CH_2$— | —$CH_3$ | —$C_2H_4CN$ | Red. |
| 21 | 6-$OCH_3$ | 3-$CH_3$ | H | —$C_2H_5$ | —$CH_2CH_2$— | —$CH_3$ | —$C_2H_4CN$ | Red. |
| 22 | 4,6-di-Cl | 3-$CH_3$ | H | —$C_2H_5$ | —$CH_2CH_2$— | —$CH_3$ | —$C_2H_4CN$ | Violet. |
| 23 | 6-Cl | 3-$CH_3$ | H | —$C_2H_5$ | —$CH_2CH_2$— | —$CH_3$ | —$C_2H_4CN$ | Red. |
| 24 | 6-SCN | 3-$CH_3$ | H | —$C_2H_5$ | —$CH_2CH_2$— | —$CH_3$ | —$C_2H_4CN$ | Red. |
| 25 | 6-$NHCOCH_3$ | 3-$CH_3$ | H | —$C_2H_5$ | —$CH_2CH_2$— | —$CH_3$ | —$C_2H_4CN$ | Red. |
| 26 | 6-$CONH_2$ | 3-$CH_3$ | H | —$C_2H_5$ | —$CH_2CH_2$— | —$CH_3$ | —$C_2H_4CN$ | Red. |
| 27 | 6-$SO_2CH_3$ | 3-$CH_3$ | H | —$C_6H_5$ | —$CH_2CH_2$— | —$CH_3$ | —$C_2H_5$ | Red. |
| 28 | 6-$SO_2CH_3$ | 3-$CH_3$ | H | —$C_6H_5$ | —$CH_2CH_2$— | —$CH_3$ | —p-tolyl | Red. |

TABLE I—Continued

| Ex. No. | (R⁶)ₘ | R¹ | R² | R³ | R⁴ | R⁵ | R⁶ | Color |
|---|---|---|---|---|---|---|---|---|
| 29 | 6-CN | —NHSO₂C₆H₅ | H | —C₂H₅ | —CH₂CH₂— | —C₄H₉ | —C₆H₄-p-OCH₃ | Red. |
| 30 | 6-CN | —NHCONHC₂H₅ | H | —C₂H₅ | —CH₂CH₂— | —C₂H₅ | —NH₂ | Red. |
| 31 | 6-SCN | —NHCOC₆H₄-p-CH₃ | H | —C₄H₉ | —CH₂CHCH₂ OOCCH₃ | —C₆H₅ | —CH₃ | Red. |
| 32 | 6-SCN | —NHCOC₆H₅ | H | —C₆H₅ | —CH₂CH₂— | —C₆H₅ | —C₆H₅ | Violet. |
| 33 | 6-SO₂CH₃ | —NHCOCH₃ | H | —C₆H₁₁ | —CH₂CH₂— | —CH₃ | —C₆H₅ | Red. |
| 34 | 6-SO₂CH₃ | —NHCOCH₃ | H | —CH₂CH(CH₃)CH₃ | —CH₂CH₂— | —CH₃ | —C₆H₅ | Red. |
| 35 | 6-SO₂CH₃ | —NHCOCH₃ | H | —C₂H₇ | —CH₂CH₂— | —CH₃ | —C₆H₄-p-CH₃ | Red. |
| 36 | 6-SO₂C₂H₅ | —NHCOCH₃ | H | —C₃H₇ | —CH₂CH₂— | —C₆H₅ | —C₆H₅ | Red. |
| 37 | 6-SO₂C₂H₅ | —NHCOCH₃ | H | —C₂H₅ | —CH₂CH₂— | —C₆H₅ | —C₆H₅ | Red. |
| 38 | 6-COOCH₃ | —NHCOCH₃ | H | —C₂H₅ | —CH₂CH₂— | —C₄H₉ | —C₆H₅ | Violet. |
| 39 | 6-COOCH₃ | —NHCOCH₃ | H | —C₂H₅ | —CH₂CH₂— | CH₂C₆H₅ | —C₆H₅ | Red. |
| 40 | 6-COOCH₃ | —NHSO₂C₆H₅ | H | H | —CH₂CH₂— | CH₂C₆H₅ | —C₆H₅ | Red. |
| 41 | 6-COOC₂H₅ | —NHCONH₂ | —OCH₃ | —C₂H₅ | —CH₂CH₂CH₂— | —C₆H₅ | —C₂H₅ | Violet. |
| 42 | 6-NO₂ | —NHCOCH₃ | —CH₃ | —C₂H₅ | —CH₂CH₂— | —C₂H₄CN | —C₂H₇ | Do. |
| 43 | 4,6-di-NO₂ | —NHCOCH₃ | H | —C₂H₅ | —CH₂CH₂— | —C₆H₅ | —C₂H₅ | Blue. |
| 44 | 4,6-di-NO₂ | —NHCOCH₂CH(CH₃)CH₃ | H | —C₂H₅ | —CH₂CH₂— | —C₆H₅ | —C₂H₅ | Do. |
| 45 | 4-Br-6-SO₂CH₃ | —NHCOCH₃ | H | —CH₂OCH₃ | —CH₂CH₂— | —C₆H₅ | —CH₃ | Violet. |
| 46 | 4-Cl-6-CN | —NHCOCH₃ | H | —C₂H₅ | —CH₂CH₂— | —C₆H₅ | —CH₃ | Do. |
| 47 | | —NHCOC₂H₅ | H | —C₂H₅ | —CH₂CH₂— | —C₆H₅ | —CH₃ | Do. |
| 48 | 6-SCN | | H | —C₆H₅ | —CH₂CH₂— | —C₆H₅ | —CH₃ | Red. |

EXAMPLE 49

2-amino-5-nitrothiazole (2.9 g.) is stirred in 60 cc. water and 32 cc. conc. H₂SO₄ is added. The solution is cooled to $-10°$ C. and a solution of 1.4 g. NaNO₂ in 10 ml. conc. H₂SO₄ is added at $-10°$ to $-5°$ C. Stirring at $-5°$ C. is continued for 10 minutes. N-β-cyanoethyl-N-methylsulfonyl-N'-ethyl-N'-m-tolylethylenediamine (6.18 g.) is dissolved in 100 cc. 15 percent aqueous sulfuric acid. The coupling solution is cooled in an ice bath and the diazonium solution added. After coupling 1 hour, the mixture is drowned in water, filtered, washed with water, and dried. The product dyes polyester fibers a blue-violet shade with good fastness properties. It has the structure:

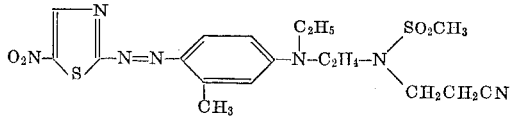

EXAMPLE 50

According to the procedure described in Example 49, 2.9 g. of 2-amino-5-nitrothiazole is diazotized and coupled with 6.0 g. of N - β-hydroxyethyl-N-methylsulfonyl-N'-ethyl-N'-m-ethylenediamine. The product obtained dyes polyester fibers brilliant blue shades displaying good fastness properties.

EXAMPLE 51

A solution of 6.82 g. of N-β-acetoxyethyl-N-methylsulfonyl-N'-ethyl-N'-m-tolylethylenediamine in 100 cc. of 15 percent aqueous sulfuric acid is cooled in an ice bath. To this solution is added a diazonium solution prepared according to Example 49 and the coupling is continued for one hour. The mixture is drowned in water, filtered, washed with water, and dried. The product dyes polyester fibers brilliant fast blue shades.

EXAMPLE 52

To 2.9 g. of 2-amino-5-nitrothiazole, stirred in 25 ml. of water, is added 13.6 ml. of conc. H₂SO₄. Solution occurs immediately. The solution is cooled to $-10°$ C. and a solution of 1.4 g. NaNO₂ in 10 ml. of conc. H₂SO₄ is added below $-5°$ C. Stirring is continued at about $-5°$ C. for 15 minutes; the diazonium solution is added to a chilled solution of 7.6 g. of N-methylsulfonyl-N-phenyl-N'-ethyl-N'-(m-acetamidophenyl)ethylene diamine dissolved in 100 ml. of 15 percent H₂SO₄ plus 100 ml. of 1:5 acid at about 0° C. The reaction mixture is allowed to stand at 0–5° C. for 30 minutes; the coupling mixture is then drowned in water. The product is collected by filtration, washed with water, and dried in air. The azo compound obtained produces heavy reddish-blue shades on polyester fibers and has the structure:

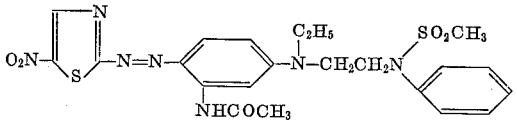

EXAMPLE 53

To 5 ml. of conc. H₂SO₄ is added 0.72 g. dry NaNO₂ portionwise with stirring. The solution is cooled and 10 ml. of 1:5 acid as added below 15° C. The mixture is cooled further and 1.25 of 2-amino-5-cyanothiazole is added followed by 10 ml. 1:5 acid, all at 0–5° C. After diazotizing at 0–5° C. for 2 hours the solution is added to a chilled solution of 4.25 g. N-benzyl-N-methylsulfonyl-N'-ethyl-N'-(m-acetamidophenyl)ethylene diamine dissolved in 100 ml. of 1:5 acid. The coupling is buffered with ammonium acetate until it is neutral to Congo Red paper. After coupling 2 hours at 0–5° C., the reaction is drowned in water. The product is collected by filtration, washed with water, and dried in air. The dye colors polyester fibers bright red shades and has the following structure:

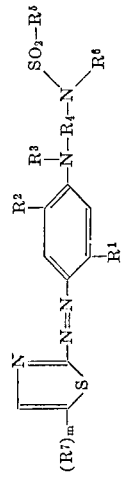

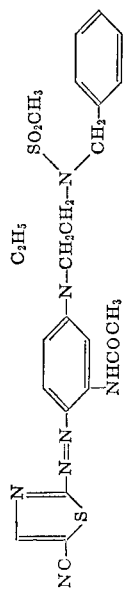

The thiazolylazo compounds of the examples of Table II are prepared by diazotizing the appropriate 2-aminothizole and coupling it with the appropriate coupler according to the procedures described in Examples 49 through 53. The azo compounds of Table II conform to the general formula

TABLE II

| Ex. No. | (R⁷)ₘ | R¹ | R² | R³ | R⁴ | R⁵ | R⁶ | Color |
|---|---|---|---|---|---|---|---|---|
| 54 | 5-NO₂ | —CH₃ | H | —C₂H₅ | —CH₂CH₂— | —CH₃ | —C₂H₄CONH₂ | Blue. |
| 55 | 5-NO₂ | —CH₃ | H | —C₂H₅ | —CH₂CH₂— | —C₂H₅ | —C₂H₄B₃ | Do. |
| 56 | 5-NO₂ | —CH₃ | H | —C₂H₄OH | —CH₂CH₂— | —C₂H₅ | —C₂H₄CO₂C₂H₅ | Violet. |
| 57 | 5-NO₂ | —CH₃ | H | —C₂H₄Cl | —CH₂CH₂— | —CH₃ | —C₂H₄OCH₃ | Blue. |
| 58 | 5-NO₂ | —CH₃ | H | —C₄H₉ | —CH₂CH₂— | —C₆H₅ | —C₂H₄NHCOCH₃ | Violet. |
| 59 | 5-NO₂ | —CH₃ | H | —C₂H₄OCOCH₃ | —CH₂CH₂— | —C₆H₅ | —C₂H₄OCNHC₆H₅ | Do. |
| 60 | 5-NO₂ | —CH₃ | H | —C₂H₄OCOCH₃ | —CH₂CH₂CH₂— | —CH₃ | —C₂H₅ | Do. |
| 61 | 5-NO₂ | H | H | —C₂H₅ | —CH₂CH₂— | —C₆H₅ | —C₂H₅ | Do. |
| 62 | 5-NO₂ | —Cl | H | —C₂H₅ | —CH₂CH₂CH₂— | —CH₃ | —C₂H₄OH | Do. |
| 63 | 5-NO₂ | —OCH₃ | H | —CH₃ | —CH₃, —CH₂OH | —m-tolyl | —C₂H₄OH | Blue. |
| 64 | 5-NO₂ | —NHCOCH₃ | H | —CH₃ | Same as above | —m-tolyl | —C₂H₄N(CO—CH₂)(CO—CH₂) (phthalimido) | Do. |
| 65 | 5-NO₂ | —OCH₃ | —OCH₃ | —CH₃ | —do— | —C₂H₄Br | Same as above | Do. |
| 66 | 4-CF₃ | —CH₃ | H | cyclohexyl | —CH₂CH₂— | —CH₃ | —C₂H₄CN | Red. |
| 67 | 4-CF₃ | —CH₃ | H | cyclohexyl | —CH₂CH₂— | —CH₃ | —C₂H₄CN | Red. |
| 68 | 4-CO₂C₂H₅ | —CH₃ | H | —OH, —CH₂CHCH₂Cl | —CH₂CH₂— | p-tolyl (—C₆H₄CH₃) | —C₂H₄CN | Red. |
| 69 | 4-CO₂C₂H₅ | —CH₃ | H | Same as above | —CH₂CH₂— | Same as above | —C₂H₄CN | Red. |
| 70 | 4-NHCOCH₃ | —CH₃ | H | —do— | —CH₂CH₂— | p-Cl-C₆H₄ | —C₂H₄CN | Red. |
| 71 | 4-NHCOCH₃ | —CH₃ | H | —C₂H₅ | —CH₂CH₂— | Same as above | —C₂H₄Cl | Red. |
| 72 | 4-C₆H₅ | —CH₃ | H | —C₂H₅ | —CH₂CH₂— | —do— | —C₃H₆N(CO—CH₂)(CO—CH₂) | Red. |
| 73 | 4-C₆H₅ | —CH₃ | H | —C₂H₅ | —CH₂CH₂— | —do— | —C₂H₄Cl | Red. |
| 74 | 5-Cl | —CH₃ | H | —C₂H₅ | —CH₂CH₂— | p-NO₂-C₆H₄ | —C₂H₄SO₂CH₃ | Red. |
| 75 | 5-Cl | —CH₃ | H | —C₂H₅ | —CH₂CH₂— | Same as above | —C₂H₄SO₂CH₃ | Red. |
| 76 | 5-SO₂C₄H₉ | —CH₃ | H | —C₂H₅ | —CH₂CH₂— | —do— | —C₂H₄SO₂CH₃ | Violet. |
| 77 | 5-SO₂C₄H₉ | —CH₃ | H | —C₂H₅ | —CH₂CH₂— | —do— | —C₂H₄OCOCH₃ | Do. |
| 78 | 4-CH₃-5-COCH₃ | —CH₃ | H | —C₂H₅ | —CH₂CH₂— | NO₂ | —C₂H₄OCOCH₃ | Do. |

TABLE I—Continued

| Ex. No. | $(R^7)_m$ | $R^1$ | $R^2$ | $R^3$ | $R^4$ | $R^5$ | $R^6$ | Color |
|---|---|---|---|---|---|---|---|---|
| 79 | 4-CH₃-5-COCH₃ | —CH₃ | H | —C₂H₅ | —CH₂CH₂— | NO₂ | —CH₂CH₂N(C₂H₄)(COCH₂) | Do. |
| 80 | 5-NO₂ | —CH₃ | H | —C₂H₅ | —CH₂CH₂— | CH₃ | phenyl | Do. |
| 81 | 5-NO₂ | —CH₃ | H | phenyl | —CH₂CH₂— | CH₃ | —C₂H₄CN | Do. |
| 82 | 5-NO₂ | —NHCOCH₃ | —OCH₃ | —C₂H₅ | —C₂H₄— | CH₃ | —CH₃ | Blue. |
| 83 | 5-NO₂ | —NHSO₂CH₃ | H | —C₂H₅ | —C₂H₄— | CH₃ | —C₆H₄-p-CH₃ | Do. |
| 84 | 5-NO₂ | —NHSO₂COOC₂H₅ | H | —CH₃ | —C₂H₄— | —OCH₃ | —C₆H₅ | Do. |
| 85 | 5-NO₂ | —NHCOCH₃ | H | —CH₃ | —C₂H₄— | —OCH₃ | —CH₂C₆H₅ | Do. |
| 86 | 5-NO₂ | —NHCOCH₃ | H | —CH₃ | —C₂H₄— | C₆H₅ | —C₆H₄-p-CH₃ | Do. |
| 87 | 5-NO₂ | —NHCOCH₃ | H | —CH₃ | —C₂H₄— | C₆H₅ | —C₆H₅ | Red. |
| 88 | 5-CONH₂ | —NHCOCH₃ | H | —CH₃ | —C₂H₄— | —C₃H₇ | —C₆H₅ | Violet. |
| 89 | 5-CONH₂ | —NHCOCH₃ | H | —CH₃ | —C₂H₄— | —C₄H₉ | —C₆H₄-p-NO₂ | Do. |
| 90 | 5-CN | —NHCOCH₃ | —CH₃ | —CH(CH₃)CH₃ | —C₂H₄— | —CH₃ | —C₂H₄CN | Red. |
| 91 | 5-CN | —NHCOCH₃ | H | —CH₃ | —C₂H₄— | —CH₃ | —C₆H₅ | Violet. |
| 92 | 5-Br | —NHCOCH₃ | —CH₃ | —C₂H₅ | —C₂H₄— | CH₃ | —C₆H₄-p-Br | Red. |
| 93 | 5-SO₂CH₃ | —NHCOCH₃ | H | —C₂H₅ | —C₃H₆— | —C₂H₅ | —C₂H₅ | Red. |
| 94 | 4-CH₃ | —NHSO₂CH₃ | H | —CH₃ | —C₂H₄— | —CH₃ | —C₂H₄CN | Violet. |
| 95 | 3-CH₃-5-SCN | —NHCOCH₃ | H | —C₂H₅ | —C₂H₄— | —CH₃ | —CH(CH₃)₂ | Red. |
| 96 | 5-SO₂C₂H₅ | —NHCOCH₃ | H | —C₂H₅ | —C₂H₄— | —CH₃ | —C₆H₅ | Red. |
| 97 | 5-COOC₂H₅ | —NHCOCH₃ | —OCH₃ | —C₂H₅ | —C₂H₄— | —C₆H₅ | —C₂H₄OOCC₂H₅ | Red. |
| 98 | 4-CF₃ | —NHCOCH₃ | H | —C₂H₅ | —C₂H₄— | —C₆H₁₁ | —C₆H₅ | Red. |
| 99 | 4-CH₃-5-NO₂ | —NHCOCH₃ | H | —C₂H₅ | —C₂H₄— | —CH₃ | —CH₃ | Blue. |
| 100 |  | —NHCOCH₃ | H | —C₂H₅ | —C₂H₄— | —CH₃ | —C₆H₅ | Red. |
| 101 | 4-NHCOCH₃ | —NHCOCH₃ | H | —C₂H₅ | —C₂H₄— | —CH₃ | —C₆H₅ | Red. |

EXAMPLE 102

Sodium nitrite (0.72 g.) is added portionwise to 5 ml. of conc. $H_2SO_4$. The solution is cooled and 100 ml. of 1:5 acid is added below 15° C. The mixture is cooled further and 1.61 g. 2-amino - 5 - ethylthio - 1,3,4 - thiadiazole is added followed by 10 ml. 1:5 acid, all below 5° C. After stirring for 2 hr. at 0–5° C. the diazonium solution is added to a chilled solution of 3.9 g. N-methylsulfonyl-N-p-tolyl - N' - (3 - acetamidophenyl) - N'-ethylethylenediamine in 100 ml. of 1:5 acid below 5° C. The reaction is kept cold and ammonium acetate added until the coupling mixture is neutral to Congo Red test paper. After allowing to couple 1 hr. at about 5° C., the reaction mixture is drowned in water. The product is collected by filtration, washed with water, and dried in air. The dye produces bright red shades on polyester fibers which exhibit excellent light and sublimation fastness. This azo compound has the structure:

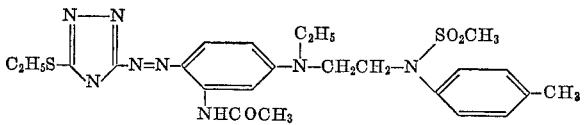

EXAMPLE 103

To a solution of nitrosyl sulfuric acid, prepared by careful addition of 0.72 g. sodium nitrite to 5 ml. concentrated $H_2SO_4$ below 80° C. and cooled to 15° C. in an ice bath, is added 10 ml. 1:5 acid (1 part propionic acid:5 parts acetic acid). The resulting solution is cooled to 5° C. and 1.79 g. 5-methyl-sulfonyl-2-amino-1,3,4-thiadiazole is added with stirring. An additional 10 ml. of 1:5 acid is added below 5° C. and the solution is stirred for 1½ hours at 0–5° C. The diazotization solution is then added to a chilled solution of 4.12 g. N-methylsulfonyl - N - phenyl - N' - (3-methylsulfonamidophenyl) - N' - ethylethylenediamine of 1:5 acid. The solution is neutralized to a brown color on Congo Red paper with ammonium acetate and allowed to couple 2 hours at ice bath temperature. The solution is drowned in water, the precipitated dye is filtered and washed with water. The azo compound obtained gives bright red dyeings on polyester fibers.

EXAMPLE 104

5 - amino - 3 - methylthio - 1,2,4 - thiadiazole (1.47 g.) is diazotized and coupled with N - methylsulfonyl-N-phenyl - N' - (3 - acetamido-phenyl) - N' - ethylethylenediamine according to the procedure employed in Example 102. The azo compound obtained possesses excellent affinity for polyester fibers on which it produces fast, brilliant, red dyeings. This compound has the structure:

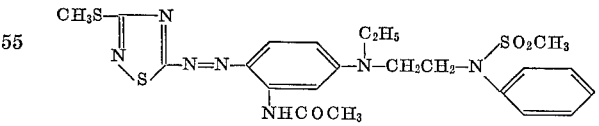

The novel azo compounds of the examples of Table III are prepared according to the procedures described in Examples 102 and 103. The compounds of Table III conform to the general formula

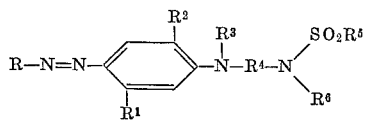

in which R is a thiadiazolyl group having the formula

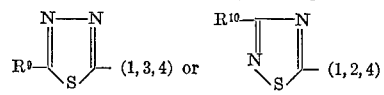

The numbers 1,3,4 and 1,2,4 designate the isomeric form of the thiadiazolyl diazo component.

TABLE III

| Ex. No. | $R^9$, $R^{10}$ isomer | $R^1$ | $R^2$ | $R^3$ | $R^4$ | $R^5$ | $R^6$ | Color |
|---|---|---|---|---|---|---|---|---|
| 105 | CH$_3$S-1,3,4 | —CH$_3$ | H | —C$_2$H$_5$ | —C$_2$H$_4$— | —CH$_3$ | —C$_2$H$_4$CN | Orange. |
| 106 | CH$_3$S-1,3,4 | —CH$_3$ | H | —C$_2$H$_5$ | —C$_2$H$_4$— | —CH$_3$ | —C$_2$H$_4$OH | Do. |
| 107 | CH$_3$S-1,3,4 | H | H | —C$_2$H$_4$OOCCH$_3$ | —C$_2$H$_4$— | —CH$_3$ | —C$_2$H$_4$CONH$_2$ | Do. |
| 108 | CH$_3$S-1,3,4 | CH$_3$COCH$_3$ | H | —C$_2$H$_5$ | —C$_2$H$_4$— | —CH$_3$ | —C$_2$H$_4$OOCCH$_3$ | Do. |
| 109 | CH$_3$S-1,3,4 | —NHCOOC$_2$H$_5$ | H | —C$_3$H$_9$ | —C$_2$H$_4$— | —C$_2$H$_5$ | —CH$_3$ | Red. |
| 110 | CH$_3$S-1,3,4 | —OCH$_3$ | —OCH$_3$ | —C$_2$H$_4$OOCC$_2$H$_5$ | —C$_2$H$_4$— | p-tolyl | —C$_6$H$_5$ | Violet. |
| 111 | C$_2$H$_5$S-1,3,4 | —CH$_3$ | H | H | —C$_2$H$_4$— | —C$_6$H$_5$ | —C$_4$H$_{11}$ | Scarlet. |
| 112 | C$_2$H$_5$S-1,3,4 | —NHCOCH$_3$ | H | —C$_2$H$_5$ | —C$_2$H$_4$— | —C$_2$H$_4$Br | 2-thiazolyl | Orange. |
| 113 | NCC$_2$H$_4$S-1,3,4 | —CH$_3$ | H | —C$_2$H$_5$ | —C$_2$H$_4$— | —CH$_3$ | p-tolyl | Red. |
| 114 | NCC$_2$H$_4$S-1,3,4 | —NHCOCH$_3$ | H | —C$_2$H$_5$ | —C$_2$H$_4$— | —CH$_3$ | —C$_2$H$_4$COOC$_2$H$_5$ | Do. |
| 115 | n-C$_4$H$_9$S-1,3,4 | —CH$_3$ | H | —C$_2$H$_5$ | —C$_2$H$_4$— | —C$_3$H$_9$-n | —C$_2$H$_4$NHCOCH$_3$ | Orange. |
| 116 | C$_6$H$_5$S-1,3,4 | —CH$_3$ | H | —C$_2$H$_5$ | —C$_2$H$_4$— | p-Cl-C$_6$H$_4$— | —C$_2$H$_4$Cl | Do. |
| 117 | C$_6$H$_5$S-1,3,4 | —NHCHO | H | —C$_2$H$_5$ | —C$_2$H$_4$— | —CH$_3$ | —C$_6$H$_5$ | Red. |
| 118 | CH$_3$SO$_2$-1,3,4 | —NHCOCH$_3$ | CH$_3$ | —C$_2$H$_5$ | —C$_2$H$_4$— | CH$_3$ | 3-pyridyl | Do. |
| 119 | CH$_3$SO-1,3,4 | —NHSO$_2$CH$_3$ | —OCH$_3$ | —C$_2$H$_5$ | —C$_2$H$_4$— | —C$_2$H$_5$ | α-naphthyl | Do. |
| 120 | C$_6$H$_5$-1,3,4 | —NHSO$_2$C$_6$H$_4$-p-CH$_3$ | H | CH$_3$ | —C$_2$H$_4$— | —CH$_3$ | 1,2,4-triazol-3-yl | Violet. |
| 121 | CH$_3$-1,3,4 | —NHSO$_2$CH$_3$ | CH$_3$ | —CH$_3$ | —C$_2$H$_4$— | —CH$_3$ | —CH$_2$C$_6$H$_5$ | Red. |
| 122 | CH$_3$-1,3,4 | —NHCOCH$_3$ | H | —C$_2$H$_5$C$_6$H$_5$ | —C$_2$H$_4$— | —CH$_3$ | p-tolyl | Red. |
| 123 | p-Cl-C$_6$H$_4$-1,3,4 | —NHCOCH$_3$ | H | —C$_2$H$_5$ | —C$_2$H$_4$— | —CH$_3$ | p-tolyl | Red. |
| 124 | CH$_3$CONH-1,3,4 | —NHCOCH$_3$ | H | —C$_2$H$_4$OCH$_3$ | —C$_2$H$_4$— | —CH$_3$ | 2-benzothiazolyl | Red. |
| 125 | p-CH$_3$OC$_6$H$_4$-1,3,4 | —NHCOCH$_3$ | H | —C$_2$H$_5$ | —C$_2$H$_4$— | —CH$_3$ | —CH$_2$C$_6$H$_5$ | Red. |
| 126 | Cl-1,3,4 | —NHCOOCH$_3$ | H | —C$_2$H$_5$ | —C$_2$H$_4$— | —CH$_3$ | —C$_6$H$_5$ | Red. |
| 127 | Br-1,3,4 | —SO$_2$C$_6$H$_5$ | H | —C$_2$H$_5$ | —C$_2$H$_4$— | —CH$_3$ | —C$_2$H$_5$ | Red. |
| 128 | H-1,3,4 | —NHCONH$_2$C$_6$H$_5$ | H | —C$_2$H$_5$ | —C$_2$H$_4$— | —CH$_3$ | —C$_2$H$_5$ | Red. |
| 129 | CH$_3$S-1,3,4 | —NHCONHC$_2$H$_5$ | H | H | —CH$_2$CH(OH)CH$_2$— | p-tolyl | —C$_6$H$_4$-p-Cl | Violet. |
| 130 | CH$_3$SO-1,3,4 | —NHCOCH$_3$ | H | —C$_2$H$_5$ | —C$_2$H$_4$— | —CH$_3$ | —C$_6$H$_3$-o,p-di-OH | Red. |
| 131 | CH$_3$SO$_2$-1,3,4 | —NHCOCH$_3$ | H | —C$_2$H$_5$ | —C$_2$H$_4$— | —CH$_3$ | 2-benzimidazolyl | Red. |
| 132 | CH$_3$S-1,3,4 | —NHCOCH$_3$ | H | —C$_2$H$_5$ | —C$_2$H$_4$— | —CH$_3$ | —C$_6$H$_5$ | Red. |
| 133 | CH$_3$S-1,3,4 | —NHCOCH$_2$CN | H | —C$_2$H$_5$ | —C$_2$H$_4$— | —CH$_3$ | —C$_2$H$_5$ | Red. |
| 134 | CH$_3$S-1,3,4 | —NHCOCF$_3$ | H | —C$_2$H$_5$ | —C$_2$H$_4$— | —CH$_3$ | —C$_6$H$_4$-p-OCH$_3$ | Red. |
| 135 | CH$_3$S-1,3,4 | —NHCOOC$_2$H$_5$ | H | —CH(CH$_3$)C$_2$H$_4$CH$_3$ | —CH$_2$CH$_2$— | p-tolyl | —C$_2$H$_5$ | Red. |
| 136 | C$_6$H$_5$CH$_2$S-1,3,4 | —NHSO$_2$C$_2$H$_4$CN | H | —C$_2$H$_5$ | —C$_2$H$_4$— | p-tolyl | —C$_6$H$_5$ | Red. |
| 137 | C$_6$H$_5$CH$_2$S-1,3,4 | —NHCOC$_6$H$_4$-p-NO$_2$ | H | —C$_2$H$_5$ | —C$_2$H$_4$— | p-anisyl | —C$_4$H$_9$-n | Red. |
| 138 | p-Cl-C$_6$H$_4$S-1,3,4 | —NHC-CH$_3$ | —OCH$_3$ | —CH$_2$C$_6$H$_5$ | —C$_2$H$_4$— | —CH$_2$C$_6$H$_4$ | —C$_4$H$_{11}$ | Violet. |
| 139 | p-CH$_3$-C$_6$H$_4$S-1,3,4 | —NHCOOCH$_3$ | H | —CH$_2$C$_6$H$_5$ | —C$_2$H$_4$— | —CH$_3$ | p-tolyl | Red. |
| 140 | NCS-1,3,4 | —NHCOOCH$_3$ | H | —CH$_3$ | —C$_6$H$_4$— | —C$_2$H$_5$ | —CH$_3$ | Red. |
| 141 | NCS-1,3,4 | —NHCOCH$_3$ | H | —CH$_3$ | —C$_2$H$_4$— | —C$_2$H$_5$ | —CH$_3$ | Red. |
| 142 | C$_2$H$_5$OOCCH$_2$S-1,3,4 | —NHCOCH$_3$ | H | —C$_2$H$_5$ | —CH$_2$CH$_2$— | p-tolyl | —CH$_3$ | Red. |
| 143 | HOC$_2$H$_4$S-1,3,4 | —NHCOCH$_3$ | H | —C$_2$H$_5$ | —CH$_2$CH$_2$— | —CH$_3$ | —CH$_3$ | Red. |
| 144 | C$_2$H$_5$OOCC$_2$H$_5$S-1,3,4 | —NHCOCH$_3$ | H | —C$_2$H$_5$ | —CH$_2$CH$_2$— | —CH$_3$ | —CH$_3$ | Red. |
| 145 | NCC$_2$H$_4$S-1,3,4 | —NHCOCH$_3$ | H | —CH$_3$ | —CH$_2$CH$_2$— | —CH$_3$ | —CH$_3$ | Red. |
| 146 | ClC$_2$H$_5$S-1,3,4 | —NHCOCH$_3$ | H | —C$_2$H$_5$ | —CH$_2$CH$_2$— | —CH$_3$ | —CH$_3$ | Red. |
| 147 | C$_6$H$_5$COOC$_2$H$_5$S-1,3,4 | —NHCOCH$_3$ | H | —C$_2$H$_5$ | —CH$_2$CH$_2$— | —CH$_3$ | —CH$_3$ | Red. |
| 148 | CH$_3$SO$_2$-1,2,4 | —NHCOOC$_2$H$_5$ | H | —CH$_3$ | —CH$_2$CH$_2$— | —CH$_3$ | —CH$_3$ | Red. |
| 149 | CH$_3$SO$_2$-1,2,4 | —CH$_3$ | H | —C$_2$H$_5$ | —(CH$_2$)$_4$— | —CH$_3$ | —C$_2$H$_4$CN | Red. |
| 150 | CH$_3$SO-1,2,4 | —NHCOCH$_3$ | H | —C$_2$H$_5$ | —CH$_2$CH$_2$— | —CH$_3$ | —C$_6$H$_5$ | Orange. |
| 151 | C$_2$H$_5$S-1,2,4 | —NHCOCH$_3$ | H | —C$_2$H$_5$ | —CH$_2$CH$_2$— | —C$_6$H$_5$ | —C$_6$H$_5$ | Red. |
| 152 | CH$_3$S-1,2,4 | —NHSO$_2$CH$_3$ | H | —C$_2$H$_5$ | —CH$_2$CH$_2$— | —CH$_3$ | —C$_6$H$_5$ | Red. |
| 153 | CH$_3$S-1,2,4 | —NHSO$_2$CH$_3$ | H | —C$_2$H$_5$ | —CH$_2$CH$_2$— | —CH$_3$ | p-tolyl | Red. |
| 154 | CH$_3$S-1,2,4 | —NHSO$_2$CH$_3$ | H | —C$_2$H$_5$ | —CH$_2$CH$_2$— | p-tolyl | —C$_6$H$_5$ | Red. |
| 155 | (CH$_3$)$_2$CHS-1,2,4 | —NHSO$_2$CH$_3$ | H | —C$_2$H$_5$ | —CH$_2$CH$_2$— | —CH$_3$ | —CH$_2$C$_6$H$_5$ | Red. |
| 156 | n-C$_4$H$_9$S-1,2,4 | —NHCHO | H | —C$_2$H$_5$ | —CH$_2$CH$_2$— | —CH$_3$ | —CH$_2$C$_6$H$_5$ | Red. |
| 157 | CH$_3$S-1,2,4 | —NHCOOCH$_2$CH(CH$_3$)$_2$ | H | —C$_2$H$_5$ | —CH$_2$CH$_2$— | —CH$_3$ | p-tolyl | Violet. |
| 158 | CH$_3$S-1,2,4 | —NHCOC$_4$H$_{11}$ | H | —C$_2$H$_5$ | —CH$_2$CH$_2$— | —CH$_3$ | p-tolyl | Red. |
| 159 | CH$_3$SO$_2$-1,2,4 | —NHCONHCH$_3$ | —OCH$_3$ | —C$_2$H$_5$ | —CH$_2$CH$_2$— | —CH$_3$ | p-tolyl | Red. |
| 160 | CH$_3$SO$_2$-1,2,4 | —NHCOC$_6$H$_4$-p-Cl | H | —C$_2$H$_5$ | —CH$_2$CH$_2$— | —CH$_3$ | p-tolyl | Red. |
| 161 | CH$_3$SO$_2$-1,2,4 | —NHCOOC$_6$H$_5$ | —CH$_3$ | —C$_2$H$_5$ | —(CH$_2$)$_4$— | p-tolyl | p-tolyl | Red. |
| 162 | (CH$_3$)$_2$CHS-1,2,4 | —CH$_3$ | H | H | —CH$_2$CH$_2$— | —CH$_3$ | —C$_2$H$_4$CN | Red. |
| 163 | n-C$_6$H$_9$CH$_2$S-1,2,4 | —NHSO$_2$CH$_3$ | H | —C$_2$H$_5$ | —CH$_2$CH$_2$— | —C$_2$H$_5$ | —C$_6$H$_5$ | Orange. |
| 164 | C$_6$H$_5$S-1,2,4 | —NHSO$_2$CH$_3$ | H | —C$_2$H$_5$ | —CH$_2$CH$_2$— | —CH$_3$ | —C$_6$H$_5$ | Red. |
| 165 | CH$_3$S-1,2,4 | —NHSO$_2$CH$_3$ | H | —C$_2$H$_5$ | —CH$_2$CH$_2$— | —CH$_3$ | —CH$_2$C$_6$H$_5$ | Red. |
| 166 | CH$_3$S-1,2,4 | —NHCOCH$_3$ | H | —C$_2$H$_5$ | —CH$_2$CH$_2$— | —CH$_3$ | —CH$_2$C$_6$H$_5$ | Red. |
| 167 | CH$_3$S-1,2,4 | —NHCOCH$_3$ | —OCH$_3$ | —C$_2$H$_5$ | —CH$_2$CH$_2$— | —CH$_3$ | —CH$_2$C$_6$H$_5$ | Red. |
| 168 | C$_6$H$_5$CH$_2$S-1,2,4 | —NHCOCH$_3$ | —CH$_3$ | —C$_2$H$_5$ | —CH$_2$CH$_2$— | p-tolyl | p-tolyl | Red. |
| 169 | CH$_3$S-1,2,4 | —NHCHO | H | —C$_2$H$_5$ | —CH$_2$CH$_2$— | —CH$_3$ | p-tolyl | Violet. |
| 170 | p-Cl-C$_6$H$_4$CH$_2$S-1,2,4 | —NHCOCH$_3$ | H | —C$_2$H$_5$ | —CH$_2$CH$_2$— | —CH$_3$ | —C$_2$H$_4$CN | Red. |
| 171 | p-CH$_3$-C$_6$H$_4$CH$_2$S-1,2,4 | —NHSO$_2$CH$_3$ | H | —C$_2$H$_5$ | —CH$_2$CH$_2$— | —CH$_3$ | p-tolyl | Red. |
| 172 | p-CH$_3$O-C$_6$H$_4$CH$_2$S-1,2,4 | —NHCOCH$_3$ | H | —C$_2$H$_5$ | —CH$_2$CH$_2$— | —CH$_3$ | p-tolyl | Red. |

EXAMPLE 173

To 5 ml. of con. $H_2SO_4$ is added portionwise 0.72 g. of $NaNO_2$ with stirring. The nitrosyl sulfuric acid solution is cooled and 10 ml. of 1:5 acid (1 part propionic:5 parts acetic) is added below 15° C. To this is added 2.00 g. 2-amino-3-nitro-5-acetylthiophene followed by 10 ml. of 1:5 acid, all at 0–5° C. The reaction is stirred at 0–5° C. for 1 hr. The diazonium solution was added to a chilled solution of 3.89 g. of N-methylsulfonyl-N-p-tolyl-N'-m-acetamidophenyl-N'-ethylethylenediamine dissolved in 75 ml. of 1:5 acid. The coupling mixture is stirred occasionally for 1 hr, and is then drowned with water. The blue azo compound is collected by filtration, washed with water, and air dried. It produces heavy blue shades on polyester fibers and has outstanding light and sublimation fastness. The structure of the product is:

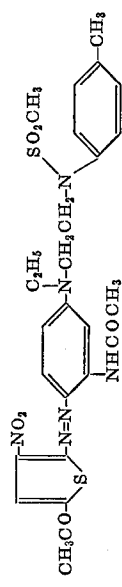

EXAMPLE 174

2-amino-5-isobutyryl-3-nitrothiophene (2.14 g.) is diazotized and coupled with 4.12 g. N-methylsulfonyl-N-phenyl-N'-ethyl-N',N'-methylsulfonamidophenyl-ethylenediamine as described in Example 173. This compound has excellent light fastness and resistance to sublimation when dyed on polyester fibers.

The thienylazo compounds appearing in Table IV are prepared by the method employed in Example 173 and have the general formula $$R^{11}\text{—}\underset{S}{\langle N \rangle}\text{—}N=N\text{—}\underset{R^1}{\overset{R^2}{\langle\phantom{X}\rangle}}\text{—}N\text{—}R^4\text{—}N\overset{SO_2\text{—}R^5}{\underset{R^6}{\langle}}$$

TABLE IV

| Ex. No. | $R^{11}$ | $R^1$ | $R^2$ | $R^3$ | $R^4$ | $R^5$ | $R^6$ | Color |
|---|---|---|---|---|---|---|---|---|
| 175 | 5-COCH$_3$-3-NO$_2$ | —CH$_3$ | H | —C$_2$H$_5$ | —CH$_2$CH$_2$— | —CH$_3$ | —C$_2$H$_4$CN | Violet. |
| 176 | 5-COCH$_3$-3-NO$_2$ | —Cl | H | —C$_2$H$_5$ | —(CH$_2$)$_4$— | —C$_6$H$_{11}$ | —C$_2$H$_4$OH | Do. |
| 177 | 5-COCH$_3$-3-NO$_2$ | —OCH$_3$ | —OCH$_3$ | —CH$_3$ | —C$_2$H$_4$— | —CH$_3$ | —C$_2$H$_4$OOCCH$_3$ | Blue. |
| 178 | 5-COCH$_3$-3-NO$_2$ | —NHCOCH$_3$ | H | —C$_2$H$_5$ | —C$_2$H$_4$— | —CH$_3$ | —C$_6$H$_5$ | Do. |
| 179 | 5-COCH$_3$-3-NO$_2$ | —NHCOCH$_3$ | H | —C$_2$H$_5$ | —C$_2$H$_4$— | —CH$_3$ | p-tolyl | Do. |
| 180 | 5-COCH$_3$-3-NO$_2$ | —NHCOCH$_3$ | H | —C$_2$H$_4$CN | —C$_2$H$_4$— | —CH$_3$ | —C$_6$H$_5$ | Do. |
| 181 | 5-COCH$_3$-3-NO$_2$ | —NHCOOC$_2$H$_5$ | H | —C$_2$H$_4$OOCCH$_3$ | —C$_2$H$_4$— | —CH$_3$ | —C$_6$H$_5$ | Do. |
| 182 | 5-COCH$_3$-3-NO$_2$ | —NHSO$_2$CH$_3$ | H | —C$_2$H$_5$ | —C$_2$H$_4$— | —CH$_3$ | —C$_6$H$_5$ | Do. |
| 183 | 5-COCH$_3$-3-NO$_2$ | —NHCOOC$_2$H$_5$ | H | —C$_2$H$_5$ | —C$_2$H$_4$— | —CH$_3$ | —CH$_2$C$_6$H$_5$ | Do. |
| 184 | 5-COCH$_3$-3-NO$_2$ | —NHSO$_2$CH$_3$ | H | —C$_2$H$_5$ | —C$_2$H$_4$— | p-tolyl | —C$_6$H$_5$ | Do. |
| 185 | 5-COCH$_3$-3-NO$_2$ | —NHCOCH$_2$Cl | H | —C$_3$H$_7$ | —C$_2$H$_4$— | p-tolyl | —C$_6$H$_5$ | Do. |
| 186 | 5-COCH$_3$-3-NO$_2$ | —NHCOCH$_2$OCH$_3$ | H | —C$_6$H$_5$ | —C$_2$H$_4$— | —CH$_3$ | —C$_6$H$_5$ | Do. |
| 187 | 5-COCH$_3$-3-NO$_2$ | —NHCOCH$_2$SCH$_3$ | —CH$_3$ | H | —C$_2$H$_4$— | p-tolyl | —C$_2$H$_4$CN | Turquoise. |
| 188 | 5-COCH$_3$-3-NO$_2$ | —NHCOCH$_3$ | —OCH$_3$ | —C$_2$H$_5$ | —C$_2$H$_4$— | —CH$_3$ | —C$_6$H$_5$ | Do. |
| 189 | 5-COCH$_3$-3-NO$_2$ | —NHCOCH$_3$ | —OCH$_3$ | —C$_2$H$_5$ | —C$_2$H$_4$— | p-tolyl | —C$_4$H$_9$ | Do. |
| 190 | 5-COCH$_3$-3-NO$_2$ | —NHCOCH$_3$ | —OCH$_3$ | —C$_2$H$_4$— | —C$_2$H$_4$— | —CH$_3$ | —C$_6$H$_5$ | Do. |
| 191 | 5-COCH$_3$-3-NO$_2$ | —NHCOC$_6$H$_5$ | H | —C$_2$H$_4$— | —C$_2$H$_4$— | —CH$_3$ | —C$_6$H$_5$ | Blue. |
| 192 | 3,5-di-SO$_2$CH$_3$ | | H | —C$_2$H$_5$ | —C$_2$H$_4$— | —CH$_3$ | —C$_6$H$_5$ | Do. |
| 193 | 5-C$_2$H$_5$CO-3-NO$_2$ | —NHCOCH$_3$ | H | —C$_2$H$_4$CONH$_2$ | —C$_2$H$_4$— | —CH$_3$ | p-tolyl | Do. |
| 194 | 5-C$_2$H$_5$SO$_2$-3-NO$_2$ | —NHCOCH$_3$ | H | —C$_2$H$_5$ | —C$_2$H$_4$— | —CH$_3$ | —C$_6$H$_5$ | Do. |
| 195 | 5-(CH$_3$)$_2$CHCO-3-NO$_2$ | —NHCOCH$_3$ | H | —C$_2$H$_5$ | —C$_2$H$_4$— | —CH$_3$ | —C$_6$H$_4$-p-OCH$_3$ | Do. |
| 196 | 3-NO$_2$ | —NHCOCH$_3$ | H | —CH$_2$C$_6$H$_5$ | —C$_2$H$_4$OCH$_2$— | —CH$_3$ | —C$_6$H$_5$ | Do. |
| 197 | 5-(CH$_3$)$_2$CH-3-NO$_2$ | —NHCOCH$_3$ | H | —CH$_3$ | —C$_2$H$_4$— | —CH$_3$ | —C$_4$H$_9$ | Do. |
| 198 | | —NHCOCH$_3$ | H | —C$_2$H$_4$N$\langle\underset{CO-CH_2}{\overset{CO-CH_2}{\phantom{X}}}\rangle$ | —C$_2$H$_4$— | —CH$_3$ | —C$_6$H$_5$ | Bluegreen. |
| 199 | | 3,5-di-NO$_2$ | —OC$_2$H$_5$ | —C$_2$H$_5$ | —C$_2$H$_4$— | —CH$_3$ | —CH$_3$ | Turquoise. |
| 200 | 5-CH$_3$(CH$_2$)$_2$CO-3-NO$_2$ | —NHCOCH(CH$_3$)$_2$ | H | —CH$_3$ | —C$_2$H$_4$— | —CH$_3$ | —CH$_2$C$_6$H$_5$ | Blue. |
| 201 | 5-CH$_3$CH$_2$CH$_2$CH$_2$CO-3-NO$_2$ | —NHCOCH(CH$_3$)$_2$ | H | —CH$_3$ | —C$_2$H$_4$— | —CH$_3$ | —C$_6$H$_5$ | Do. |
| 202 | 5-CH$_3$(CH$_2$)$_2$CO-3-NO$_2$ | —NHCOC$_6$H$_5$ | H | —C$_6$H$_5$ | —C$_2$H$_4$— | —CH$_3$ | p-tolyl | Do. |
| 203 | 5-CH$_3$COO-3-NO$_2$ | —NHCOCH$_3$ | H | —C$_2$H$_5$ | —C$_2$H$_4$— | —CH$_3$ | p-tolyl | Do. |
| 204 | 5-CH$_3$(CH$_2$)$_2$CO-3-NO$_2$ | —NHSO$_2$C$_6$H$_4$-p-Cl | H | —C$_6$H$_5$ | —C$_2$H$_4$— | —CH$_3$ | —C$_6$H$_5$ | Do. |
| 205 | 5-C$_6$H$_5$CO-3-NO$_2$ | —NHCOCH$_3$ | H | —CH$_3$ | —C$_2$H$_4$— | —CH$_3$ | —C$_6$H$_5$ | Do. |

The compounds of the invention can be used for dyeing linear polyester textile materials in the manner described in U.S. Pats. 2,880,050, 2,757,064, 2,782,187 and 3,043,827. The novel monoazo compounds are water-insoluble, i.e. substantially water-insoluble, and therefore they can be applied to polyester fibers according to conventional disperse dyeing techniques. The following example illustrates a carrier dyeing procedure for applying the azo compounds of the invention to dye polyester textile materials.

EXAMPLE 206

An amount of 0.1 g. of the azo compound is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of a solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for the removal of residual carrier) for 5 minutes at 350° F.

The compounds of the invention can also be applied to polyester textile materials by the heat fixation technique described in U.S. Pat. 2,663,612 and in the American Dye-Stuff Reporter, 42, 1 (1953). The following procedure describes how the azo compounds of the invention can be applied to polyester materials by the heat fixation technique.

EXAMPLE 207

A mixture of the compound of Example 35, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a microsize container (an accessory for a 1-quart size Szegvari Attritor) for approximately 3.5 hours. Enough 1/8-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing:

1 ml. of complex diaryl sulfonate surfactant (Compound 8-S), 3 ml. of a 3% solution of a sodium N-methyl-N-oleoyltaurate (Igepon T-S1), 8 ml. of a 25% solution of natural gums (Superclear 8ON), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pickup is about 60% based on the weight of the fabrics.

The padded fabrics are then dried at 200° F. and then heat-fixed for 2 minutes at 415° F. in a forced air oven. The dyed fabrics are scoured for 20 minutes at 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745, and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the compounds of the invention are particularly suitable for dyeing polyester textile materials, the compounds can also be used to dye other synthetic, hydrophobic textile materials such as cellulose acetate, modified polypropylene, polyamide, or modacrylic fibers.

The invention has been described in considerable detail with particular reference to preferred embodiments thereof, but it will be understood that variations and modifications can be effected within the spirit and scope of the invention as described hereinabove.

We claim:

1. A monoazo compound having the formula

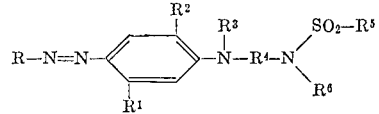

wherein
R is a group having the formula

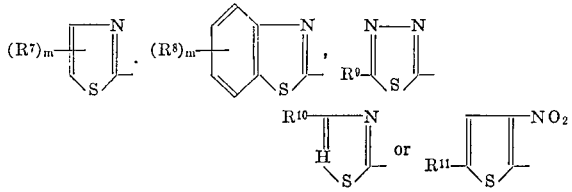

wherein
$R^7$ is hydrogen, lower alkyl, lower alkoxy, nitro, chlorine, bromine, lower alkylsulfonyl, carbamoyl, lower alkylcarbamoyl, di-lower alkylcarbamoyl, lower alkoxycarbonyl, sulfamoyl, lower alkylsulfamoyl, di-lower alkylsulfamoyl, cyano, thiocyanato, trifluoromethyl, phenyl, lower alkylphenyl, lower alkoxyphenyl, chlorophenyl or bromophenyl;

$R^8$ is hydrogen, lower alkyl, lower alkoxy, nitro, chlorine, bromine, lower alkylsulfonyl, lower cyanoalkylsulfonyl, lower hydroxyalkylsulfonyl, lower chloroalkylsulfonyl, lower bromoalkylsulfonyl, carbamoyl, lower alkylcarbamoyl, di-lower alkylcarbamoyl, lower alkoxycarbonyl, sulfamoyl, lower alkylsulfamoyl, di-lower alkylsulfamoyl, cyano, thiocyanato, lower alkylthio, cyclohexylthio, phenylthio, lower alkylphenylthio, lower alkoxyphenylthio, chlorophenylthio, bromophenylthio, or trifluoromethyl;

$R^9$ is hydrogen, lower alkyl, lower alkoxy, chlorine, bromine, phenyl, lower alkylthio, benzythio, cyclohexylthio, phenylthio, lower alkylphenylthio, lower alkoxyphenylthio, chlorophenylthio, bromo-phenylthio, benzyl lower alkylsulfonyl, lower alkanoylamino, lower alkylsulfonamido, benzamido, lower alkoxycarbonyl, or lower alkoxycarbonylalkylthio;

$R^{10}$ is lower alkylthio, cyclohexylthio, benzylthio, or lower alkylsulfonyl;

$R^{11}$ is lower alkanoyl, benzoyl, lower alkylbenzoyl, lower alkoxybenzoyl, chlorobenzoyl, bromobenzoyl, or nitrobenzoyl; and $m$ is 1 or 2;

$R^1$ is hydrogen, lower alkyl, lower alkoxy, chlorine, bromine or the group —NHA in which A is formyl, lower alkanoyl, lower chloroalkanoyl, lower bromoalkanoyl, lower phenylalkanoyl, lower cyanoalkanoyl, lower alkoxyalkanoyl, lower alkylthioalkanoyl, lower alkylsulfonylalkanoyl, benzoyl, lower alkylbenzoyl, lower alkoxybenzoyl, chlorobenzoyl, bromobenzoyl, cyclohexylcarbonyl, lower alkoxycarbonyl, lower cyanoalkoxycarbonyl, lower hydroxyalkoxycarbonyl, phenoxycarbonyl, lower alkylphenoxycarbonyl, lower alkoxyphenoxycarbonyl, chlorophenoxycarbonyl, bromophenoxycarbonyl, lower alkylsulfonyl, lower cyanoalkylsulfonyl, lower chloroalkylsulfonyl, lower bromoalkylsulfonyl, phenylsulfonyl, lower alkylphenylsulfonyl, lower alkoxyphenylsulfonyl, chlorophenylsulfonyl, bromophenylsulfonyl, carbamoyl, lower alkylcarbamoyl, di-lower alkylcarbamoyl, phenylcarbamoyl, lower alkylphenylcarbamoyl, lower alkoxyphenylcarbamoyl, chlorophenylcarbamoyl, or bromophenylcarbamoyl;

$R^2$ is hydrogen, lower alkyl, lower alkoxy;

$R^3$ is hydrogen; lower alkyl; lower alkyl substituted with hydroxy, lower alkoxy, cyano, lower alkanoyloxy, lower alkoxycarbonyl, bromine, chlorine, lower alkanoylamino, carbamoyl, lower alkylcarbamoyl, phenylcarbamoyl, lower alkylsulfonyl, lower alkoxycarbonyloxy, succinimido, glutarimido, phthalimido, phenyl, lower alkyl phenyl, lower alkoxyphenyl, hydroxyphenyl, chlorophenyl, bromophenyl, phenoxy, lower alkylsulfonamido, pyrrolidinono, piperidono, or phthalimidino; cyclohexyl; phenyl; or phenyl substituted with lower alkyl, lower alkoxy, hydroxy, chlorine, bromine, or nitro;

$R^4$ is lower alkylene or lower alkylene substituted with hydroxy, chlorine, bromine, or lower alkanoyloxy;

$R^5$ is lower alkyl, lower chloroalkyl, lower bromoalkyl, cyclohexyl, amino, phenyl or phenyl substituted with lower alkyl, lower alkoxy, hydroxy, chlorine, bromine, or nitro; and $R^6$ is lower alkyl substituted with hydroxy, chlorine, bromine, cyano, lower alkanoyloxy, lower alkoxy, lower alkanoylamino, lower alkylsulfonyl, carbamoyl, lower alkoxycarbonyl, phenylcarbamoyloxy, phenyl or phenyl substituted with lower alkyl, lower alkoxy, hydroxy, chlorine, bromine, or nitro; cyclohexyl; phenyl; phenyl substituted with lower alkyl, lower alkoxy, hydroxy, chlorine, bromine or nitro; naphthyl; thiazolyl; benzothiazolyl; thiadiazolyl; triazolyl; benzimidazolyl; pyridyl; quinolyl; or when $R^1$ is —NHA, lower alkyl.

2. A compound according to claim 1 having the formula

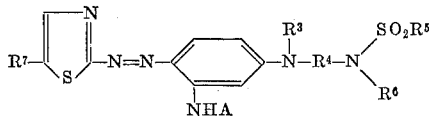

wherein $R^7$ is cyano, nitro, lower alkylsulfonyl or lower alkoxycarbonyl;

A is lower alkanoyl, benzoyl, lower alkoxycarbonyl, lower alkylsulfonyl, or lower alkylcarbamoyl;

$R^3$ is alkyl; alkyl substituted with hydroxy, chlorine, bromine, lower alkoxy, cyano or lower alkanoyloxy; or benzyl;

$R^4$ is ethylene or propylene;

$R^5$ is lower alkyl, phenyl, lower alkylphenyl or lower alkoxyphenyl; and $R^6$ is lower alkyl, phenyl, lower alkylphenyl, or benzyl.

3. A compound according to claim 1 having the formula

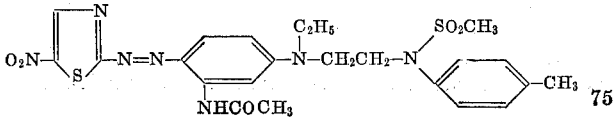

4. A compound according to claim 1 having the formula

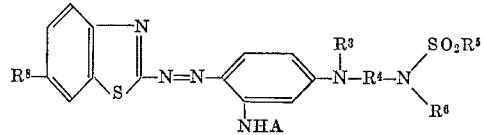

wherein $R^8$ is cyano, nitro, lower alkylsulfonyl, lower alkoxycarbonyl, or thiocyanato;

A is lower alkanoyl, benzoyl, lower alkoxycarbonyl, lower alkylsulfonyl, or lower alkylcarbamoyl;

$R^3$ is alkyl; alkyl substituted with hydroxy, chlorine, bromine, lower alkoxy, cyano or lower alkanoyloxy; or benzyl;

$R^4$ is ethylene or propylene;

$R^5$ is lower alkyl, phenyl, lower alkylphenyl or lower alkoxyphenyl; and $R^6$ is lower alkyl, phenyl, lower alkylphenyl or benzyl.

5. A compound according to claim 1 having the formula

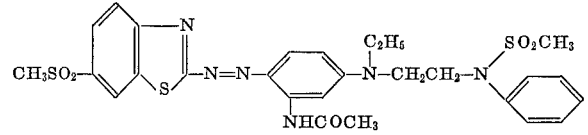

6. A compound according to claim 1 having the formula

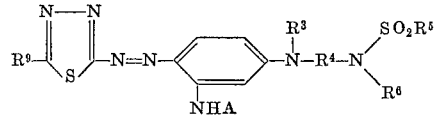

wherein $R^9$ is lower alkyl, lower alkylthio, cyclohexylthio, phenyl, phenylthio, lower alkylsulfonyl, or lower alkoxycarbonyl;

A is lower alkanoyl, benzoyl, lower alkoxycarbonyl, lower alkylsulfonyl, or lower alkylcarbamoyl;

$R^3$ is alkyl; alkyl substituted with hydroxy, chlorine, bromine, lower alkoxy, cyano or lower alkanoyloxy; or benzyl;

$R^4$ is ethylene or propylene;

$R^5$ is lower alkyl, phenyl, lower alkylphenyl or lower alkoxyphenyl; and $R^6$ is lower alkyl, phenyl, lower alkylphenyl, or benzyl.

7. A compound according to claim 1 having the formula

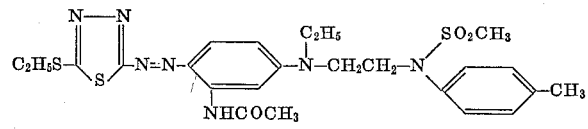

8. A compound according to claim 1 having the formula

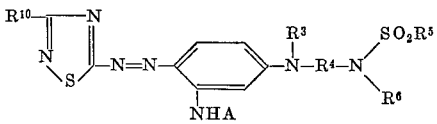

$R^{10}$ is lower alkylthio or lower alkylsulfonyl;

A is lower alkanoyl, benzoyl, lower alkoxycarbonyl, lower alkylsulfonyl, or lower alkylcarbamoyl;

$R^3$ is alkyl; alkyl substituted with hydroxy, chlorine, bromine, lower alkoxy, cyano or lower alkanoyloxy; or benzyl;

$R^4$ is ethylene or propylene;

$R^5$ is lower alkyl, phenyl, lower alkylphenyl or lower alkoxyphenyl; and $R^6$ is lower alkyl, phenyl, lower alkylphenyl, or benzyl.

9. A compound according to claim 1 having the formula

10. A compound according to claim 1 having the formula

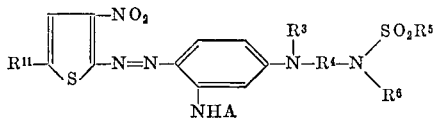

wherein $R^{11}$ is lower alkanoyl, benzoyl, lower alkylbenzoyl, lower alkoxybenzoyl, chlorobenzoyl, bromobenzoyl, or nitrobenzoyl;

A is lower alkanoyl, benzoyl, lower alkoxycarbonyl, lower alkylsulfonyl, or lower alkylcarbamoyl;

$R^3$ is alkyl; alkyl substituted with hydroxy, chlorine, bromine, lower alkoxy, cyano or lower alkanoyloxy; or benzyl;

$R^4$ is ethylene or propylene;

$R^5$ is lower alkyl, phenyl, lower alkylphenyl or lower alkoxyphenyl; and $R^6$ is lower alkyl, phenyl, lower alkylphenyl, or benzyl.

11. A compound according to claim 1 having the formula

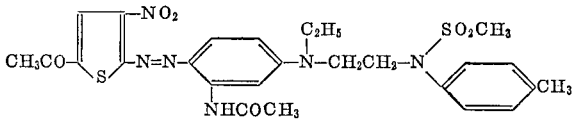

References Cited
UNITED STATES PATENTS

| | | | |
|---|---|---|---|
| 2,955,901 | 10/1960 | Kruckenberg | 260—158 X |
| 3,007,914 | 11/1961 | Dittmar et al. | 260—163 X |
| 3,171,710 | 3/1965 | Chapman et al. | 260—152 X |
| 3,379,713 | 4/1968 | Wallace et al. | 260—158 |
| 3,380,990 | 4/1968 | Wallace et al. | 260—158 |
| 3,428,621 | 2/1969 | Wallace et al. | |

FLOYD D. HIGEL, Primary Examiner

U.S. Cl. X.R.

8—4, 41 C; 117—138.8 F; 260—40 R, 152, 155, 156, 157

PO-1050
(5/69)

UNITED STATES PATENT OFFICE
CERTIFICATE OF CORRECTION

Patent No. 3,631,020  Dated December 28, 1971

Inventor(s) Max A. Weaver and David J. Wallace

It is certified that error appears in the above-identified patent and that said Letters Patent are hereby corrected as shown below:

Insert ---Thiazole--- as the first word in the title.

Column 2, lines 14 and 15, delete "thiocyanate" and insert ---thiocyanato---.

Column 4, line 18, delete "stragiht-" and insert ---straight- ---

Column 4, the first ring on lines 73 to 75 should read as follows:

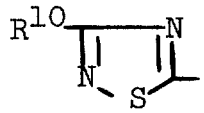

Column 5, line 71, after "13.9" insert ---g.---.

Claim 1, lines 37 to 41, the first ring should read as follows:

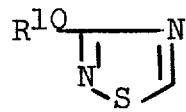

Claim 9, the formula should read as follows:

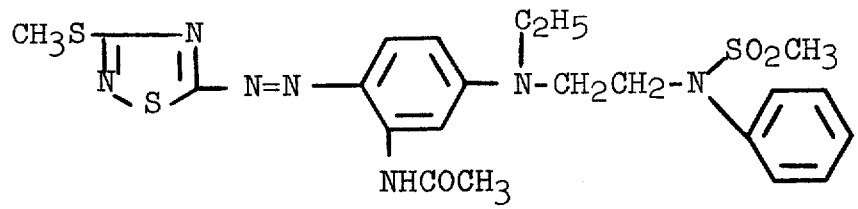

Signed and sealed this 30th day of May 1972.

(SEAL)
Attest:

EDWARD M. FLETCHER, JR.
Attesting Officer

ROBERT GOTTSCHALK
Commissioner of Patents